(12) United States Patent
Ogawa et al.

(10) Patent No.: US 7,645,110 B2
(45) Date of Patent: Jan. 12, 2010

(54) MOVING ROBOT WITH ARM MECHANISM

(75) Inventors: Hideki Ogawa, Yokosuka (JP); Nobuto Matsuhira, Yokohama (JP); Junko Hirokawa, Kawasaki (JP); Toshiyuki Koga, Kawasaki (JP); Manabu Nishiyama, Kawasaki (JP); Takaki Inazumi, Tokyo (JP); Teppei Nakamura, Kawasaki (JP); Rikako Bekku, Tokyo (JP)

(73) Assignees: Kabushiki Kaisha Toshiba, Tokyo (JP); Tama Art University, Tokyo (JP)

( * ) Notice: Subject to any disclaimer, the term of this patent is extended or adjusted under 35 U.S.C. 154(b) by 814 days.

(21) Appl. No.: 11/389,379

(22) Filed: Mar. 27, 2006

(65) Prior Publication Data

US 2007/0048118 A1     Mar. 1, 2007

(30) Foreign Application Priority Data

Aug. 31, 2005   (JP)   ............................. 2005-251511

(51) Int. Cl.
*B60P 1/00*        (2006.01)
(52) U.S. Cl. ....................... 414/547; 414/679; 414/729; 901/1; 901/15; 180/8.2
(58) Field of Classification Search ................... 901/15, 901/18, 1; 180/8.1, 8.3, 8.4, 8.2; 414/547, 414/679, 729
See application file for complete search history.

(56) References Cited

U.S. PATENT DOCUMENTS 3,451,224 A * 6/1969 Colechia et al. ............. 405/190

(Continued)

FOREIGN PATENT DOCUMENTS

JP          2004-230509          8/2004

OTHER PUBLICATIONS

JP 2004230509 A (Hachitani, Shuji) Aug. 19, 2004 (English machine translation of foreign publication already of record on applicant's IDS of Mar. 27, 2006). [online][retrieved Aug. 26, 2009]. Retrieved from: http://dossier1.ipdl.inpit.go.jp/AIPN/odse_top_dn.ipdl?N0000=7400.*
"Home-Use Robot "Wakamaru"", Mitsubishi Heavy Industries, Ltd. Technical Review, vol. 40, No. 5, Sep. 2003, pp. 270-273.

(Continued)

*Primary Examiner*—Saúl J Rodriguez
*Assistant Examiner*—Jonathan D Snelting
(74) *Attorney, Agent, or Firm*—Oblon, Spivak, McClelland, Maier & Neustadt, L.L.P.

(57) ABSTRACT

A moving robot includes a first arm portion is coupled to a first joint on a side portion of a main robot body. The first arm portion has concave portion with an opening. A folding mechanism is accommodated in the concave portion. In the folding mechanism, a second arm portion is connected to the first arm via a second joint portion. A third arm portion is also connected to the second arm portion via a third joint portion. The first arm portion is rotated around the first joint to orient the opening in an upper direction. The second joint portion can be slid along the concave portion to take out the folding mechanism through the opening. The third arm portion can be rotated around the third joint portion to extend the third arm portion.

10 Claims, 9 Drawing Sheets

U.S. PATENT DOCUMENTS

| | | | | |
|---|---|---|---|---|
| 3,922,930 | A | * | 12/1975 | Fletcher et al. ............ 74/665 B |
| 5,413,454 | A | * | 5/1995 | Movsesian .................. 414/729 |
| 5,570,992 | A | * | 11/1996 | Lemelson ................ 414/744.3 |
| 7,266,421 | B1 | * | 9/2007 | Blayrac et al. ............... 700/217 |
| 2005/0240310 | A1 | * | 10/2005 | Wang et al. ................. 700/245 |

OTHER PUBLICATIONS

Miwa Ueki, et al., "Development of Office Service Robot", The 22$^{nd}$ Annual Conference of Robotics Society of Japan (RSJ 2004), 2004, 2 pages (with English Abstract).

* cited by examiner

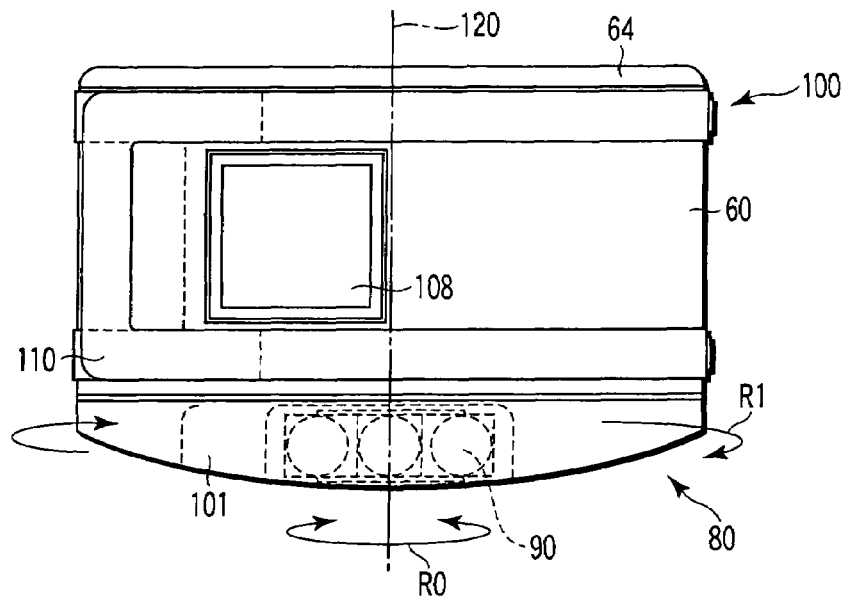
F I G. 1A
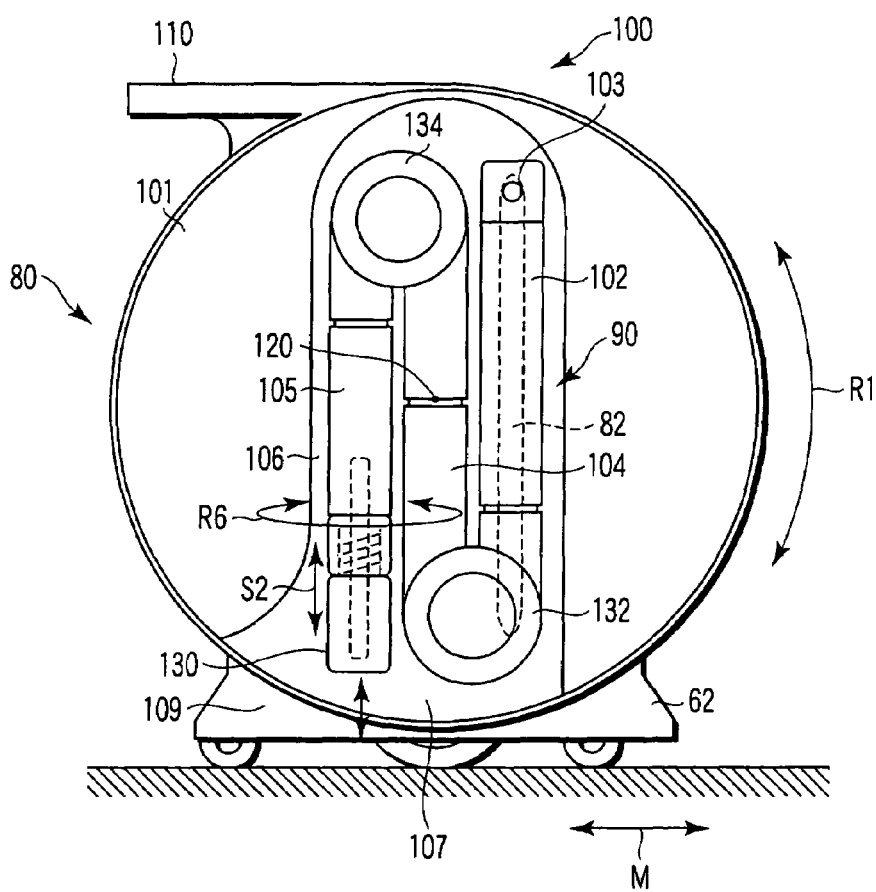
F I G. 1B

MOVING ROBOT WITH ARM MECHANISM

CROSS-REFERENCE TO RELATED APPLICATIONS

This application is based upon and claims the benefit of priority from prior Japanese Patent Application No. 2005-251511, filed Aug. 31, 2005, the entire contents of which are incorporated herein by reference.

BACKGROUND OF THE INVENTION

1. Field of the Invention

The present invention relates to a moving robot with an arm mechanism, and in particular, to a moving robot with an arm mechanism that loads and transports an article on the robot, which moves within a house or within a building such as a facility, the moving robot being used for services.

2. Description of the Related Art

In recent years, various service robots sharing activity spaces with people have come onto the market. Arms are mounted on a main robot body to access a specified article, handle the target article, and carry the gripped article in accordance with instructions from a human operator. A large number of robots on which arms are thus mounted have been proposed. Such robots are disclosed in, for example, Jpn. Pat. Appln. KOKAI Publication No. 2004-230509 "Moving Robot" and Naoto KAWAUCHI and four others, "Home Use Robots 'wakamura'", Mitsubishi Heavy Industries, LTD. Technical Report, Mitsubishi Heavy Industries, LTD., September 2003, Vol. 40, No. 5, P. 270 to 273. The service robots disclosed in these documents normally have mounted arms attached to the laterally opposite sides of the main body. Consequently, while the service robot is moving, for example, to transport an article, the mounted arms may collide against surrounding objects or damage a person or make him or her fear the robot when it crosses the person. These robots are thus considered to be insufficiently safe. Accordingly, in the conventional service robots, the arms mounted on a moving carrier are covered with an opening and closing cover provided separately from the arms, in order to improve safety and to prevent users from fearing the robots.

If the arm housing opening and closing cover is provided as described in Jpn. Pat. Appln. KOKAI Publication No. 2004-230509, it is placed so as to cover the whole arms. This disadvantageously increases the size of the moving robot itself. Further, the moving robot requires the cover to be opened and closed every time the arms are extended. Thus, disadvantageously, the arm extending operation requires a long time and is cumbersome. Some service robots are configured so that the arms can be folded for housing. These service robots can be made compact by folding the arms. However, the size of the mounted robot itself, including the length of its arms, needs to be increased in order to widen the range within which the arms are movable in picking up or placing an article. This is not preferable in terms of safety.

BRIEF SUMMARY OF THE INVENTION

According to an aspect of the present invention is provided a moving robot comprising:

a main robot body having a side portion and a first joint provided on the side portion;

a moving mechanism, on which the main robot body is mounted, configured to move the main robot body;

a first arm portion coupled to the first joint and being rotatable around the first joint, the first arm portion having a first concave portion with an first opening;

a first mechanism capable to be accommodated in the first concave portion in a first folded state, the first mechanism including a second arm portion, a second joint portion coupling the second arm portion to the first arm portion, a third arm portion, and a third joint portion coupling the third arm portion to the second arm portion, the third arm portion being folded at the third joint portion toward the second arm portion in the first folded state, and the third arm portion being extendable at the third joint portion from the second arm portion in a first extendable state in which the first mechanism is located out of the first concave portion;

a first driver configured to rotate the first arm portion around the first joint, so that the first opening is oriented in an arbitrary direction;

a first mover configured to move the first mechanism in the first folded state into and out of the first concave portion through the first opening; and a second driver configured to rotate the third arm portion around the third joint portion in the first extendable state so that the third arm portion is folded at the third joint portion toward the second arm portion or is extended at the third joint portion from the second arm portion.

BRIEF DESCRIPTION OF THE SEVERAL VIEWS OF THE DRAWING

FIGS. 1A and 1B are a top view and a side view schematically showing a moving robot on which an arm mechanism in accordance with a first embodiment of the present invention is mounted;

DETAILED DESCRIPTION OF THE INVENTION

Figure 2:
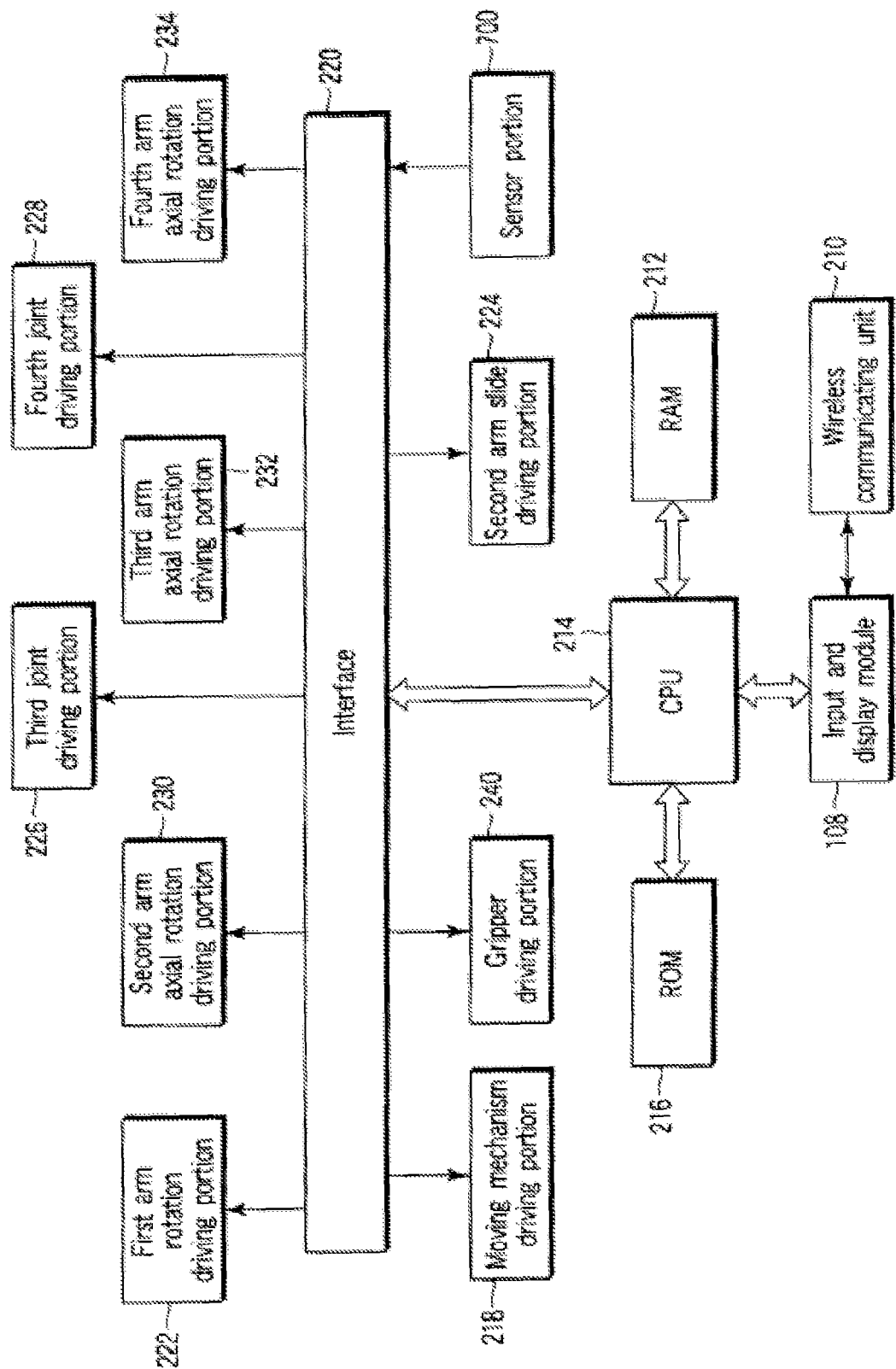
FIG. 2 is a block diagram schematically showing a circuit system that drives the moving robot shown in FIG. 1.

With referring to the drawings, there will be described a moving robot with an arm mechanism in accordance with an embodiment of the present invention.

First Embodiment

FIGS. 1A and 1B are top and side views which schematically show the top and side surface structures, respectively, of an arm mounted moving robot 100 with an arm mechanism in accordance with a first embodiment of the present invention.

As shown in FIG. 1A, the arm mounted moving robot 100 comprises a main body 60 shaped generally like a cylinder and fixedly placed on a pedestal portion 62. The pedestal portion 62 is provided with a moving mechanism portion 109 having moving wheels that move the moving robot 100 in a front-to-rear and lateral directions. A transported article mounting portion 110 is provided at the top of the main body 60; the transported article mounting portion 110 has a placement surface that extends in a substantially horizontal direction and on which the moving robot 100 mounts a transported article. The main body 60 is provided with an input and display module 108 that enables the arm-mounted moving robot 100 to be operated and which can display the status of the arm mounted moving robot 100.

The moving robot 100 shown in FIGS. 1A and 1B is of a type in which an arm mechanism 80 is mounted on only one side of the robot. One side of the generally cylindrical main body 60 is closed by a plate-like cover portion 64. As shown in FIG. 1B, a first arm portion 101 is provided on the other side of the main body 60. The first arm portion 101 is shaped like a disk lid in association with the shape of the side surface or side portion of the main body 60. The first arm portion 101 functions as a first arm. The disk lid-like first arm portion 101 is held so as to be rotatable, by a rotating mechanism, around a rotation axis 120 as shown by arrow R0; the rotating mechanism is not shown in the drawings and provided in the main body 60, and the rotation axis 120 passes through the center of the main body 60. The rotating mechanism rotates the first arm portion 101 along arrow R1. Since the disk lid-like first arm portion 101 is thus rotatable, the rotation axis 120 corresponds to a first joint of the first arm portion 101 with respect to the main body 60. As described later, a slide telescoping mechanism (not shown) is provided in the first arm portion 101. A substantial arm portion corresponds to a part of the first arm portion 101 between a slide shaft 103 of the slide telescoping mechanism and the rotation axis 120. The distance between the slide shaft 103 and the rotation axis 120 is defined as an arm length.

A recess as a housing portion 106 is formed in the first arm portion 101; the recess is suitably shaped so that a manipulator mechanism 90 corresponding to the folded arm portion, that is, an arm folding mechanism, can be housed in the recess. As shown in FIG. 1B, the manipulator mechanism 90 is composed of the slide shaft 103, serving as a second joint to connect the manipulator mechanism 90 to the main body 60, a second, third, and fourth arm portions 102, 104, and 105, and a third and fourth joints 132 and 134 connecting the second, third, and fourth arm portions 102, 104, and 105 together. The manipulator mechanism 90 is folded at the third and fourth joints 132 and 134 so that the second, third, and fourth arm portions 102, 104, and 105 are substantially parallel and is then housed in the housing portion 106. A gripper portion 130 gripping an article described later is attached to the tip of the fourth arm portion 105, corresponding to a free end of the manipulator mechanism 90.

The housing 106 has an opening 107 formed in an outer periphery of the first arm portion 101 so as to extend the manipulator mechanism 90 out of housing portion 106; the opening 107 enables the folded manipulator mechanism 90 to be moved along the side surface or side portion of the main body 60 and into or out of the housing portion 106. The first arm portion 101 is formed of, for example, a monocoque frame so as to have a smooth outer surface. As is also apparent from FIG. 1A, the recess as the housing section 106 has such a depth that the folded manipulator mechanism 90 can be entirely housed in the housing portion 106 without projecting from the housing portion 106. This prevents a projection from being created on the side of the moving robot 100 as long as the manipulator mechanism 90 is housed in the housing portion 106. Even if the moving robot 100 is moved as shown by arrow M to bring the outer surface of the manipulator mechanism 90 into contact with an obstacle, a person, or the like on a moving path, the first arm portion 101, having the smooth outer surface, prevents the moving robot 100 from being caught on the obstacle, person, or the like to damage it.

The first arm portion 101, shown in FIGS. 1A and 1B, is exposed when the manipulator mechanism 90 is housed in the housing portion 106. However, the housing portion 106 may be covered, with only the opening 107 open. The manipulator mechanism 90 is moved in and out via the opening 107 and is not slid sideward from the first arm portion 101, that is, along the rotation axis 120. Accordingly, the side surface or portion of the manipulator mechanism 90 may be covered.

A slide groove 82 is formed in a bottom surface of the housing portion 106 to make the slide shaft 103 of the slide telescoping mechanism movable; the slide groove 82 extends along the longitudinal direction of the housing portion 106. The slide shaft 103 of the slide telescoping mechanism is connected to a base of the second arm portion 102. Accordingly, when the slide telescoping mechanism is actuated to move the slide shaft 103 through the slide groove 82, the folded manipulator mechanism 90 is extended from the first arm portion 101 through the extension opening 107.

Figure 3A:
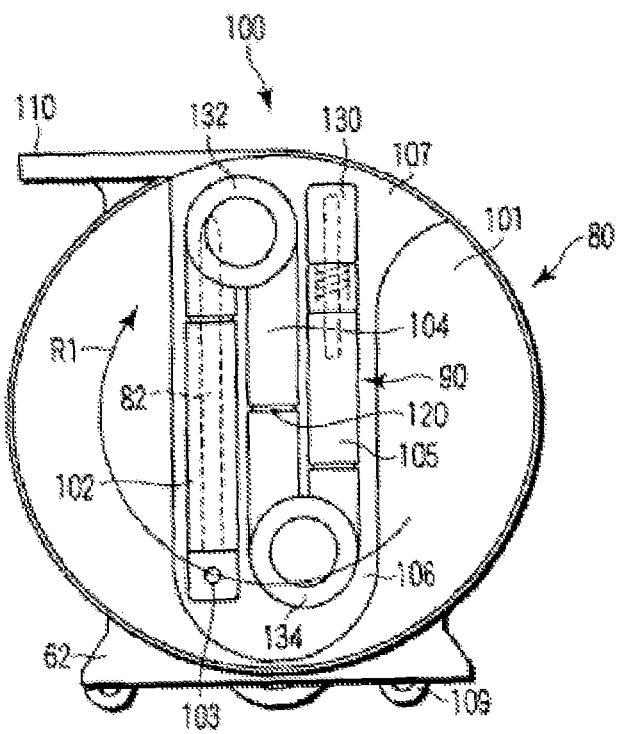
FIGS. 3A and 3B are side views schematically showing an example of an extending operation of the arm mechanism of the moving robot shown in FIGS. 1A and 1B as well as an example of an operation of a movable portion of the moving robot.
Figure 3B:
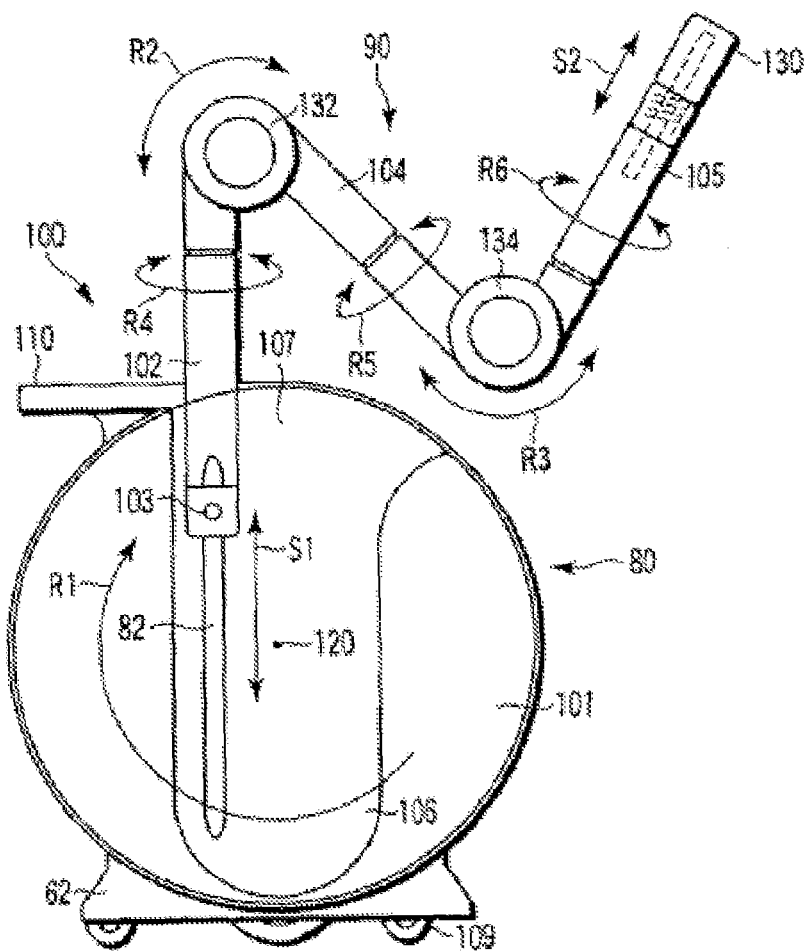

As shown in FIG. 1A, the slide shaft 103 is attached to the base of the second arm 102. The slide shaft 103 is positioned eccentrically to the rotating shaft 120 of the first arm portion 101. Thus, the movable range of the manipulator mechanism 90 corresponds to the combination of the range within which the first arm portion 101 is rotatively driven and the range within which the second arm portion 102 is slid and telescopically driven. This makes it possible to increase a height (range) reached by the gripper portion 130, located at the tip of the manipulator mechanism 90, when the mechanism 90 is extended. Further, the opening 107 is provided on the first arm portion 101 and rotated around the rotating shaft 120. The manipulator mechanism 90 can thus be extended in any direction within the angular range of 360° around the circumference of the main robot body as required. The arm mechanism shown in FIG. 3B is an example in which a gripper 105 is mounted on an arm portion consisting of seven joints. However, the number of joints and arm portions is selected according to the degree of freedom of the mounted arm portion. Obviously, the degree of freedom and the structure are not limited provided that the arm portion can be folded and housed In the above embodiment, the first arm portion 101 is cylindrically formed. However, the first arm portion 101 is not limited to the cylindrical shape but may be shaped like a column having regular polygonal side surfaces.

The moving robot 100 with the arm mechanism shown in FIGS. 1A and 1B are operated as described below.

First, a wireless communicating unit 210 shown in FIG. 2 receives a radio signal as an input signal to set a target operation of the arm mechanism. Alternatively, an input and display module 108 is utilized to input a target operation such as transportation of an article and a target article such as a transported article. This input signal is temporarily stored in RAM 212 shown in FIG. 2, via CPU 214. When the moving robot 100 starts an operation, an actuation program is read from ROM 216 into CPU 214, which then gives an operational instruction to a moving mechanism driving portion 218 via an interface 220 in accordance with a target portion. The moving mechanism portion 109 is thus operated to move the moving robot to the target position, where the robot is stopped. While the robot is stopped, a first arm rotation driving portion 222 shown in FIG. 2 is actuated to operate the rotating mechanism in the main body 60 in accordance with the actuation program. The first arm portion 101 is thus rotated around the rotation axis 120 as shown by arrow R1 to orient the opening 107 in the first arm portion 101 in a predetermined direction depending on the position of the target article. For example, the opening 107 is oriented upward as shown in FIG. 3B. The opening 107 is oriented in the predetermined direction to determine the direction in which the manipulator mechanism 90 is extended. A second arm slide driving portion 224 of the second arm portion 102 then actuates the slide telescoping mechanism to move the slide shaft 103 along the slide groove 82 as shown by arrow S1 in FIG. 3B. As a result, the manipulator mechanism 90 is pulled out of the first arm portion 101.

The manipulator mechanism 90 is extended by actuating an arm driving mechanism (not shown). The slide telescoping mechanism extends the second arm portion 102 from the first arm portion 101. A third joint driving portion 226 is actuated so that the third arm portion 104 is inclined at a certain angle of aperture to the second arm portion 102. The third arm portion 104 is thus rotated around the third joint portion 132 as shown by arrow R2. A fourth joint driving portion 228 is actuated to incline the fourth arm portion 105 at a certain angle of aperture to the third arm portion 104. The fourth arm portion 105 is thus rotated around the fourth joint portion 134 as shown by arrow R3. Consequently, the manipulator mechanism 90 is extended. The distance from the rotation axis 120 to the gripper portion 130 is determined by the basis of the slide length of the slide shaft 103, the angle of aperture of the third arm portion 104, shown by arrow R2, the angle of aperture of the fourth arm portion 105, shown by arrow R3, and the arm lengths of the first to fourth arm portions 101, 102, 104, and 105. Therefore, the distance from the rotation axis 120 to the gripper portion 130 can be adjusted by regulating the slide length and the angles of aperture.

As shown in FIG. 3B, the second arm portion 102 of the manipulator mechanism 90 is rotated around its axis by a second arm axial rotation driving portion 230 as shown by arrow R4, to rotate the joint 132, connected to the second arm portion 102. The third arm portion 104, connected to the joint 132, is also rotated around its axis by a third arm axial rotation driving portion 232 as shown by arrow R5, to similarly rotate the joint 134, connected to the third arm portion 104. The fourth arm portion 105, connected to the joint 134, is also rotated around its axis by a fourth arm axial rotation driving portion 234 as shown by arrow R6, to similarly rotate the gripper portion 130, connected to the fourth arm portion 105. Consequently, the gripper portion 130 can be made to access the target article by rotating the arm portion of the extended manipulator mechanism 90 around the shaft through a predetermined angle and adjusting the slide length and the angles of aperture.

The gripper portion 130 comprises a gripping mechanism which can be slid along an axial direction of the gripper portion 130 by a gripper driving portion 240 and which grips an article. The gripper portion 130 can thus grip the target article. It is therefore possible to transport and place the target article onto the transported article mounting portion 110 by adjustably driving the arm portions of the manipulator mechanism 90 in accordance with instructions from CPU 214.

Once the target article is placed on the transported article mounting portion 110, the extended manipulator mechanism 90 is folded and an operation reverse to the above extending operation is performed also in accordance with instructions from CPU 214; the manipulator mechanism 90 is drawn into the housing portion 106 through the opening 107.

Second Embodiment

Figure 4A:
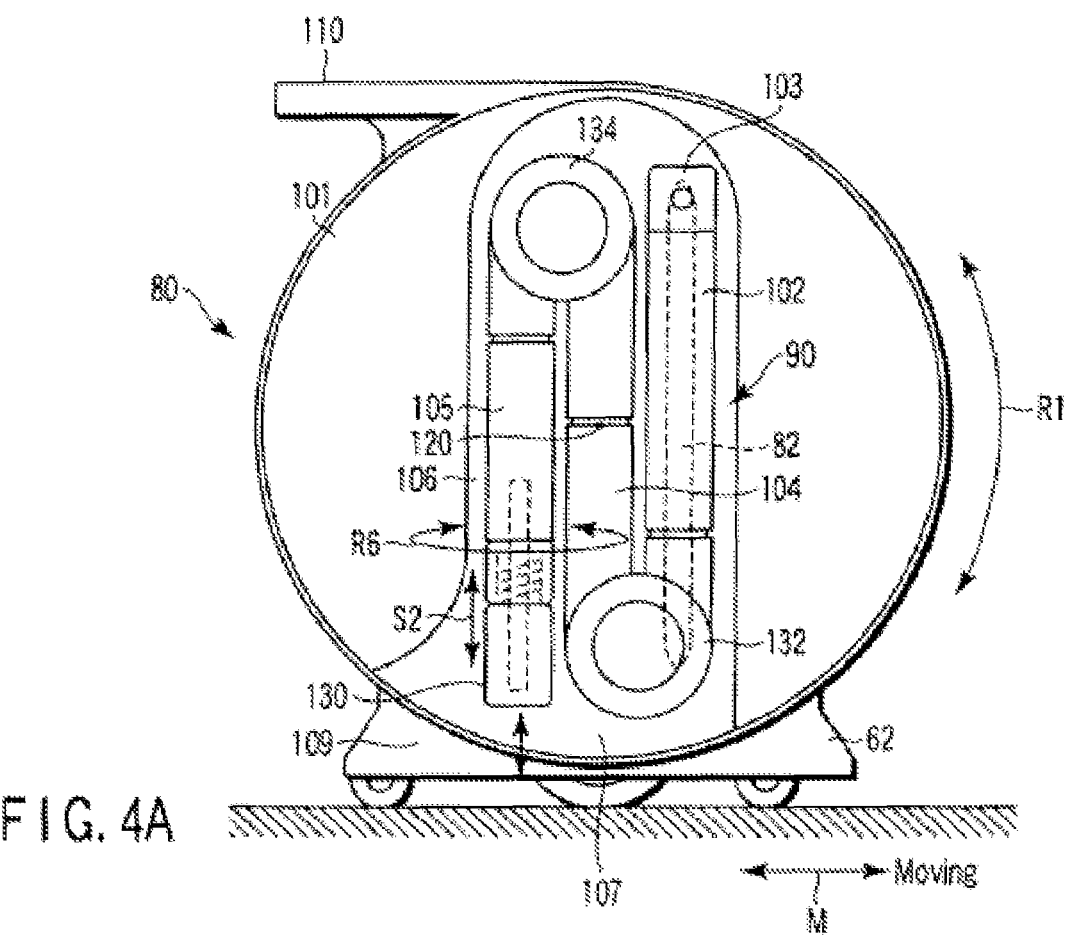
FIGS. 4A and 4B are a side view and a top view schematically showing a moving robot in accordance with a second embodiment of the present invention.
Figure 4B:
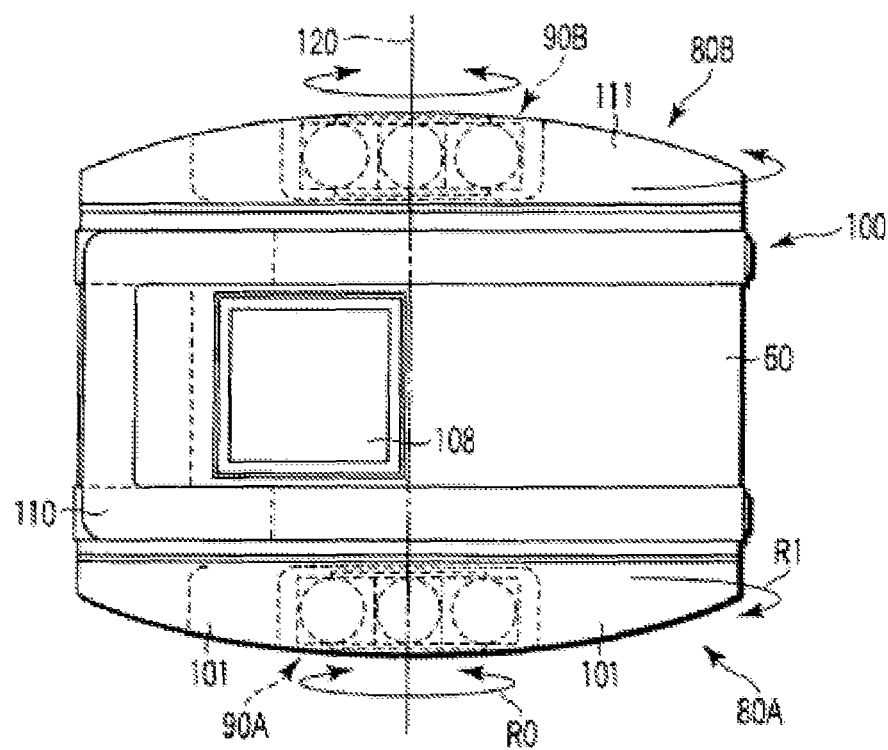

With reference to FIGS. 4A and 4B, description will be given of the arm mounted moving robot 100 in accordance with a second embodiment of the present invention. FIGS. 4A and 4B are a side view and a top view schematically showing the arm mounted moving robot 100 in accordance with the second embodiment of the present invention. The moving robot 100 shown in FIGS. 4A and 4B comprises a first mounted arm mechanism and a second mounted arm mechanism on the respective side portions of the robot main body. In FIGS. 4A and 4B, the same reference numerals as those shown in FIGS. 1A to 3B denote the same positions or parts and will not be described in detail.

The first and second mounted arm mechanisms 80A and 80B have the same structure and comprise first arm portions 101 and 111, respectively. The rotation axis center of each of the first arm portions 101 and 111 coincides with the rotation axis 120, located almost in the center of the main body side surface or portion. The first arm portions 101 and 111 are attached to the robot main body 60 symmetrically with respect to it. As already described, manipulator mechanisms 90A and 90B are folded and housed in the housing portions 106 of the first arm portions 101 and 111. The manipulator mechanisms 90A and 90B are extended as described with reference to FIG. 3B and are then folded again into the housing portions 106.

In the moving robot 100 shown in FIGS. 4A and 4B, the mounted arm portions 101, 111, 102, 104, and 105 can also be easily extended during an extending operation without being subject to interference. It is also possible to allow the first and second mounted arm mechanisms 80A and 80B to perform different operations. As shown in an example of an operation in FIG. 5, the two manipulator mechanisms 90A and 90B can also be synchronously moved in parallel in the horizontal direction as the first arm portions 101 and 111 are rotated. It is thus possible to access an article that cannot be handled by the single manipulator mechanism 90A or 90B owing to the large mass of the article. The article can then be mounted on the transported article mounting portion 110, provided in the main robot body 60.

Figure 5:
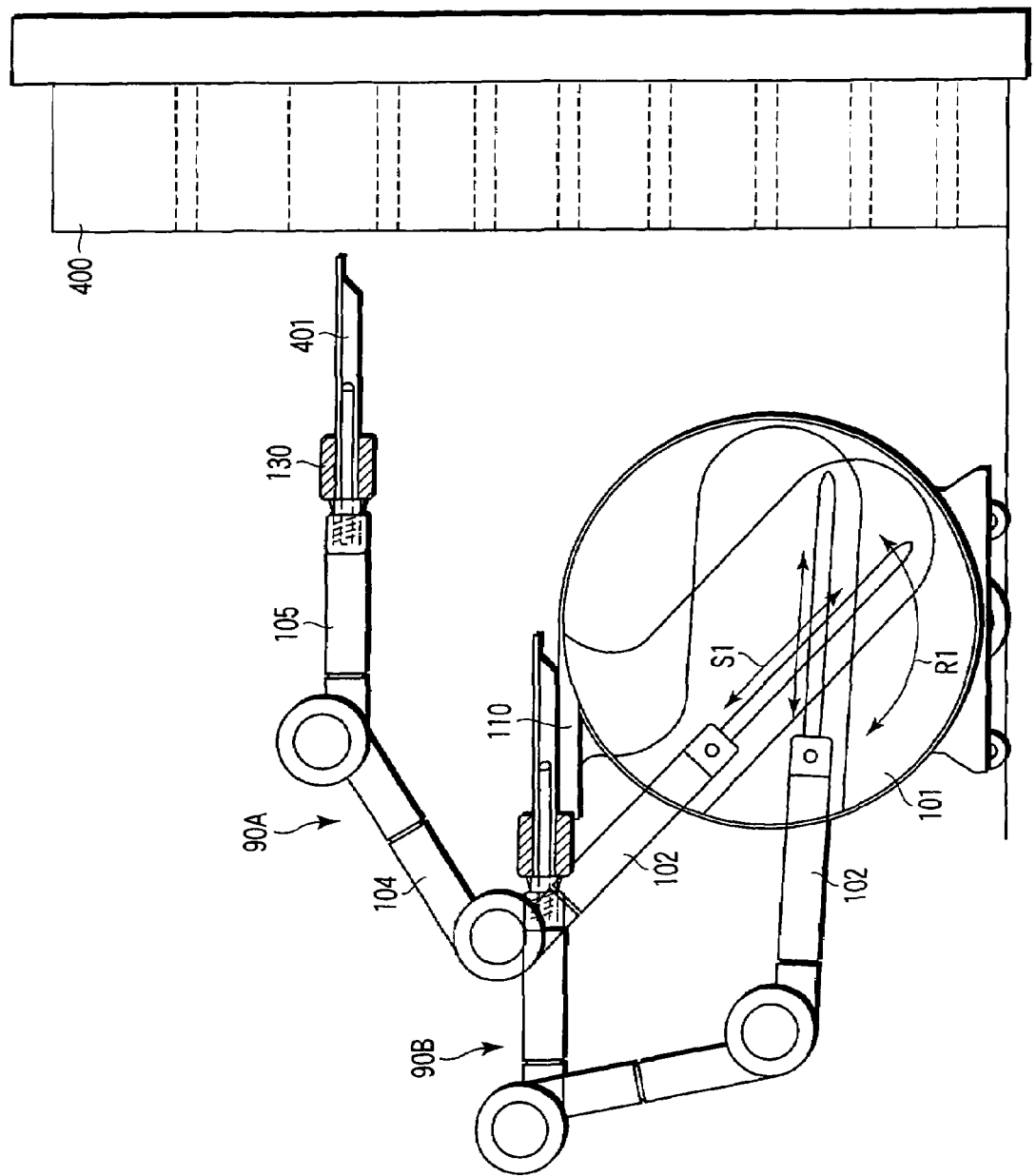
FIG. 5 is a side view showing an example of an operation of the arm mechanism of the moving robot shown in FIG. 4.

The example of an operation in FIG. 5 shows how the arms move when the mounted manipulator mechanisms 90A and 90B grip a tray 401 housed in a housing shelf 400 and mount it on the transported article mounting portion 110.

The operation of the first and second arm portions 101 and 102 enables the widening of movable range of the mounted arm mechanisms 80A and 80B. This makes it possible to widen the range within which the manipulator mechanisms 90A and 90B can access the housing shelf 400, from a high position to a low position close to the floor.

Figure 6:
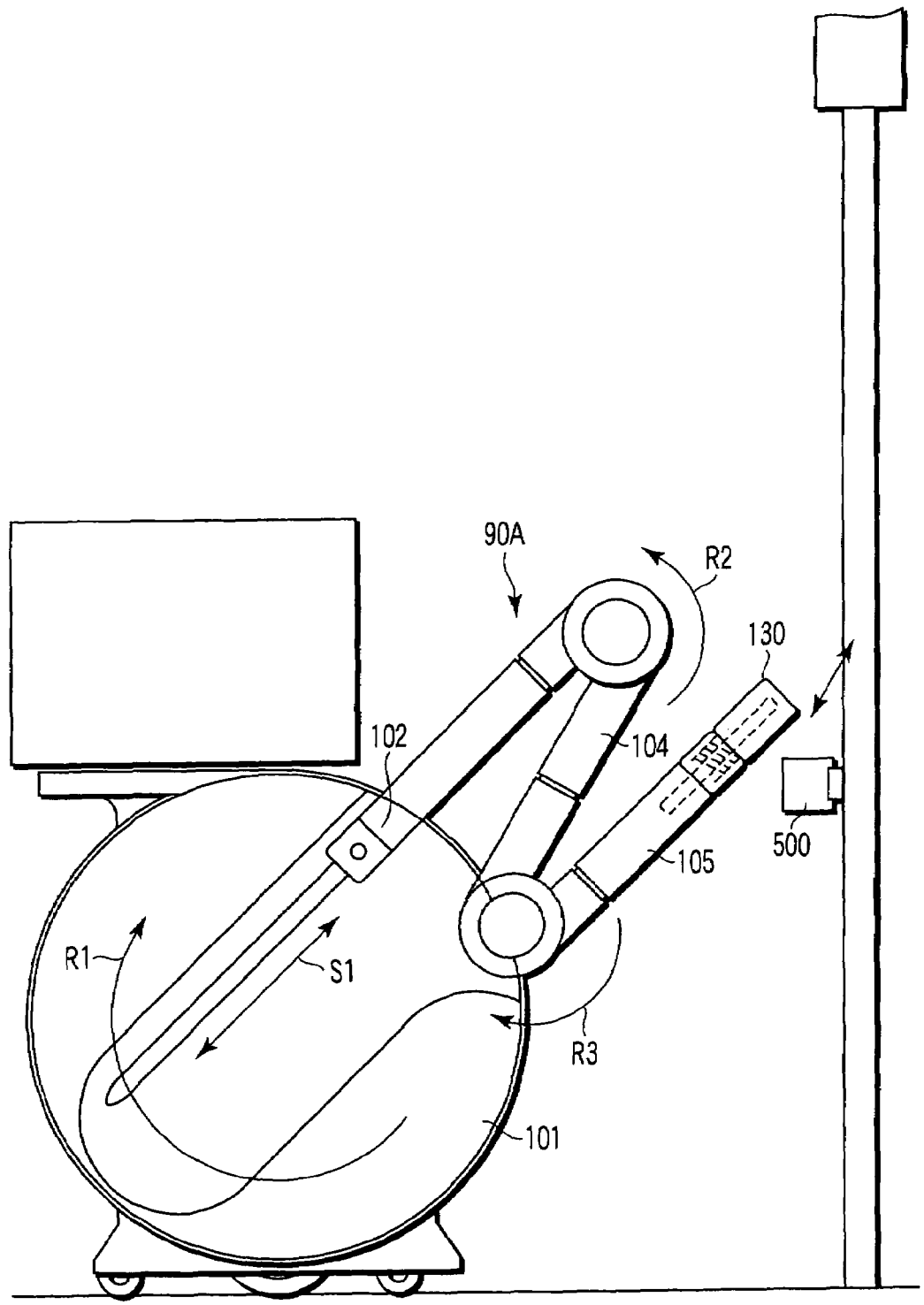
FIG. 6 is a side view showing another example of an operation of the arm mechanism of the moving robot shown in FIG. 4.

FIG. 6 also shows an example of an operation of the arm mechanism 80 in which a large box-like article mounted on the moving robot is moved. Even if a door needs to be opened during movement, the mounted arm mechanism 80 itself can be easily extended. A transporting operation can be performed over a wide area by extending the manipulator mechanisms 90A and 90B so that they can access and open a door knob 500 as shown in FIG. 6.

Figure 7A:
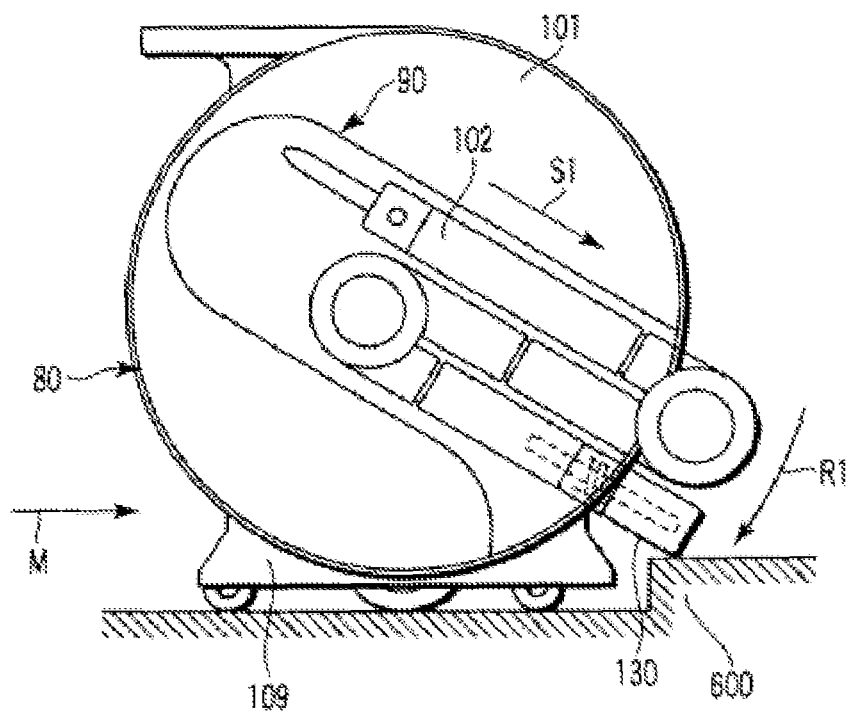
FIGS. 7A and 7B are side views schematically showing a movement supporting operation performed by the arm mechanism to enable the robot to climb over a step.
Figure 7B:
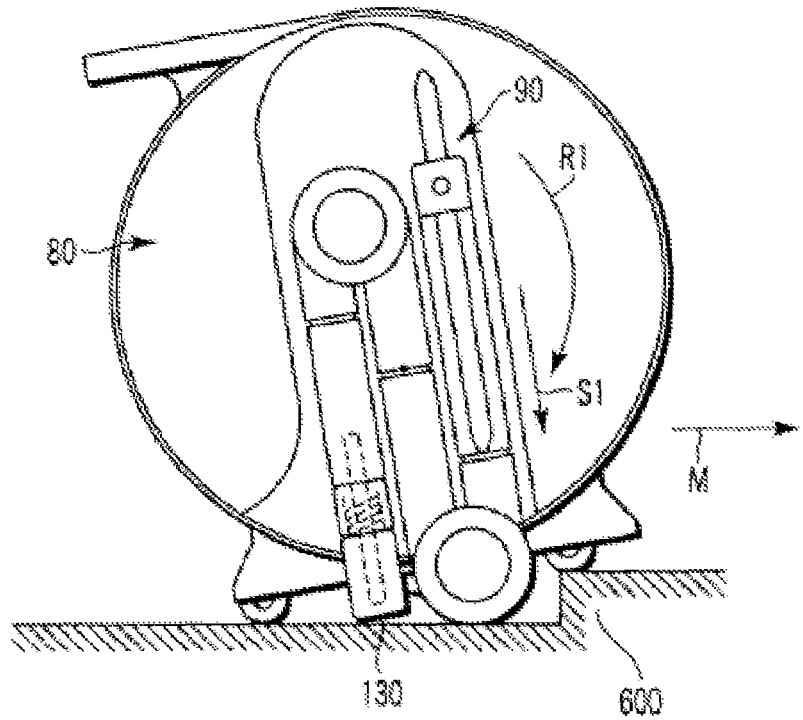

The moving robot shown in FIGS. 4A and 4B can utilize its arm mechanisms 80A and 80B to climb over a step as shown in FIGS. 7A and 7B. For a step 600 that cannot be climbed over using only the moving mechanism 109 or a floor surface having a specified or larger gradient not shown in the drawings, the moving robot can climb over the step or the floor surface, during a moving operation for transportation of an article, using the combination of an operation of rotating the first arm portion 101 of the mounted arm and an arm driving operation involving a telescopic operation of sliding the second arm portion 102 toward the floor surface. When a sensor (not shown) detects a step or a slope with a gradient, the manipulator mechanisms 90A and 90B are extended toward the floor surface to abut the gripper portion 130 against the floor surface so as to lift driving portion wheels of the main robot body 60 as shown in FIG. 7A. The first arm portion 101 is then rotated to lift the driving portion wheels onto the step as shown in FIG. 7B. The wheels can thus be moved onto the step. Thus, when the moving robot 100 climbs over the step 600, the gripper portion 130 supports the body of the robot itself and the first arm portion 101 can exert a force required to drive the robot so that the robot can climb over the step. The mounted arm mechanism 80 can support a moving operation not only on an uneven floor surface such as the one shown in FIGS. 7A and 7B but also on floor surfaces under different conditions. The moving robot can thus move on various floor surfaces on which it cannot move using only the driving wheels.

Third Embodiment

Figures 8A, 8B:
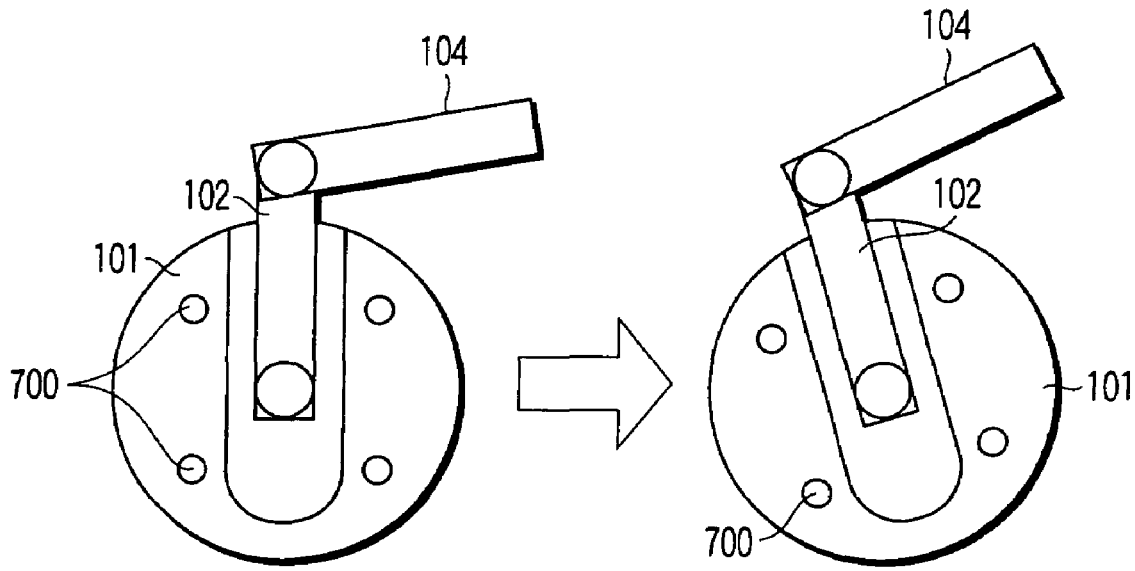
FIGS. 8A and 8B are schematic diagrams showing an example in which detecting sensors are placed on the arm mechanism to sense a surrounding obstacle, the detecting sensors rotating together with the arm mechanism of the moving robot shown in FIG. 4.

FIGS. 8A and 8B are schematic diagrams showing the arm mounted moving robot 100 in accordance with a third embodiment of the present invention. If a plurality of sensors 700 sensing a surrounding obstacle, for example, ultrasonic sensors or photoelectric distance sensors, are arranged on a periphery of a side surface or portion of the cylinder constituting the first arm portion 101 as shown in FIGS. 8A and 8B, the sensors 700 are rotated together with the first arm 101 as shown in FIG. 8A. Accordingly, although the sensor positions need to be corrected in accordance with the rotating angle, sensing operations are not hindered during operations including extension of the arms. This enables surrounding obstacles to be stably detected.

Figures 9A, 9B:
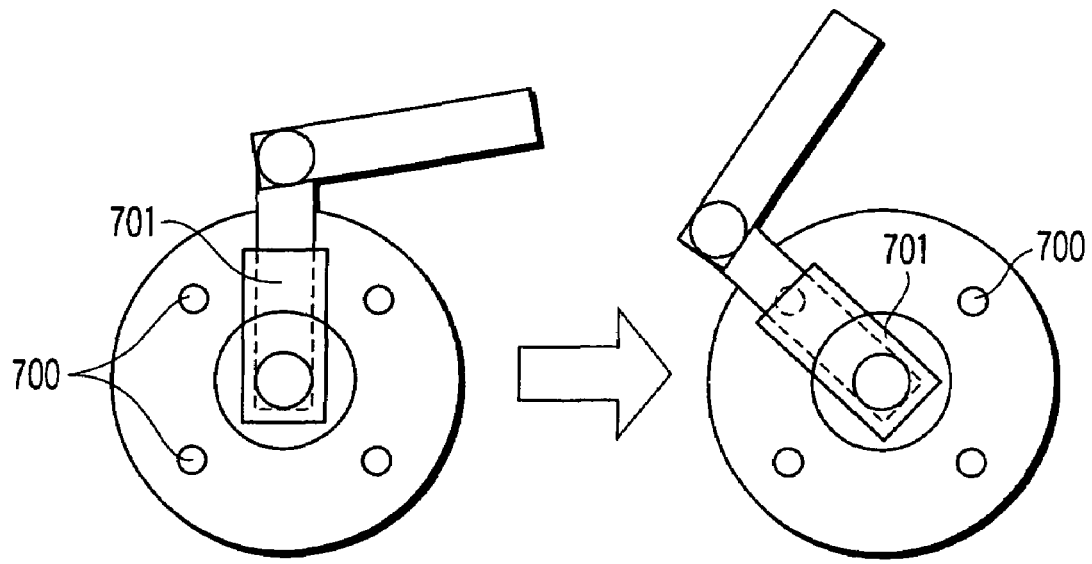
FIGS. 9A and 9B are schematic diagrams showing a comparative example of the arm mechanism of the moving robot shown in FIG. 4 in which the detecting sensors are fixedly placed on the arm mechanism to sense a surrounding obstacle.

In contrast, in a mounted arm structure 701 shown in FIGS. 9A and 9B as a comparative example, the positions of the sensors 700 are fixed and the arm portion may pass by the sensors 700 during operation. This often prevents sensing operations.

If the plurality of sensors 700, sensing surrounding obstacles, are arranged on not only the side surface but also the top surface of the cylinder constituting the first arm, the sensing operation of the sensors 700 is also prevented from being hindered during the arm extending operation or any other arm operations. Obstacles can thus be stably sensed.

Outputs from the sensors 700 are analyzed by CPU 214 via the interface 220 as shown in FIG. 2. As a result, the position and size of an obstacle are detected.

Fourth Embodiment

Figure 10:
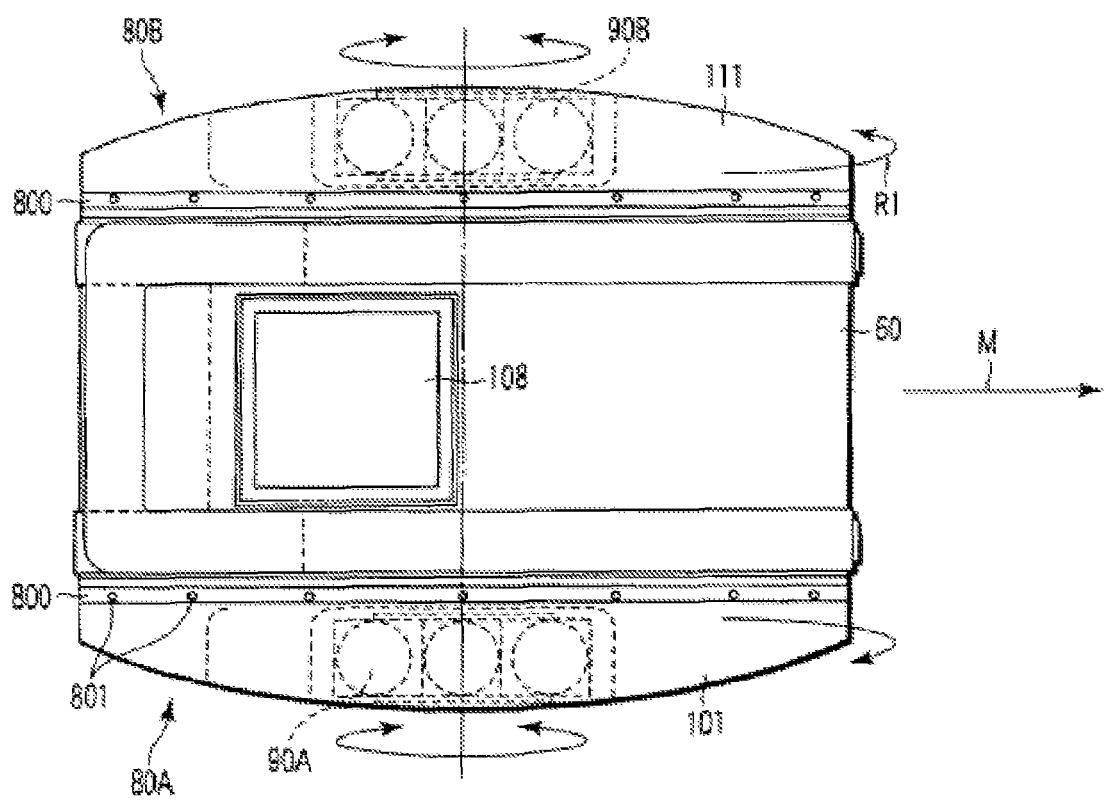
FIG. 10 is a top view schematically showing a moving robot on which indicator portions are mounted in accordance with a fifth embodiment of the present invention.

FIG. 10 is a top view showing the arm mounted moving robot 100 in accordance with a fifth embodiment of the present invention. A plurality of indicator portions 800 such as light emitting elements 801 are provided along a rotating direction R1 on the periphery of a structural part of each of the first arm portions 101 and 111, having the arm housing concave structure 106, which part is close to the side surface of the main body 60. In the indicator portions 800, the plurality of light emitting elements 800, emitting light in the same color or different colors, have their light emission statuses controllably changed by CPU 214, depending on an operational status including the extendable driving of the arm portion of the arm mounted moving robot. For example, the plurality of light emitting elements 800 are blinked or have their emission colors changed. The change in luminescent colors includes alternate blinking of different luminescent colors. The indication status of the indicator portions 800 enables people around the robot to determine the operational status of the moving robot 100 to approach the robot without fearing it. This also improves safety. For example, while the robot is moving, the indicator portions are lighted in blue to inform the people of the approach of the robot. If the indicator portions are provided on the opposite sides of the robot, when the robot makes a right or left turn, the corresponding blue indicator portions can be blinked to inform people of the turning direction. Further, when the manipulator mechanisms 90, 90A, and 90B start an extending operation, the luminescent color can be changed to red to alert people to the start of the extending operation. This enables the robot to operate safely for the people.

As described above, the arm mounted on the moving robot in accordance with the present invention, the arm mechanism can be compactly housed in the structural portion without projecting from it. This makes it possible to improve the safety of the robot during an inoperative state or during movement. The movable range of the arms can also be widened by appropriately driving the first and second arm portions.

With the moving robot on which the arm mechanism is mounted in accordance with the present invention, the whole arm can be housed in the robot main body without projecting from it. The first arm itself also constitutes a part of the main body. The movable range can be widened by the extension of the arms involving the rotating of the first arm and the telescopic driving of the second arm. This makes it possible to increase the reach of tips of the arms and to reduce the height of the robot for an operation of transporting or moving an article within a building. Further, the whole moving robot is compact and the arms do not project from the main body. This prevents the robot from coming into contact with or colliding with an object in the moving path. The robot can thus moved safely even to a relatively narrow place. Consequently, when the robot passes a person in a corridor, the person is prevented from fearing the robot.

According to an aspect of the present invention, by using the extendable driving operation of the mounted manipulator mechanism, it is possible to perform an operation of climbing over a step or moving on an inclined floor surface which operation cannot be achieved using only the conventional moving mechanism. Moreover, according to anther aspect of the present invention, the sensors sensing a surrounding object are arranged in the robot main body. The sensors are arranged on the first arm portion and thus move together with the first arm portion even when the other mounted arm portion is driven. This prevents the detecting operation of the sensors from being hindered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving robot comprising:
    a main robot body having a side portion and a first joint provided on the side portion;
    a moving mechanism, on which the main robot body is mounted, configured to move the main robot body;
    a first arm portion coupled to the first joint and being rotatable around the first joint, the first arm portion having a first concave portion with a first opening;
    a first mechanism capable to be accommodated in the first concave portion in a first folded state, the first mechanism including a second arm portion, a second joint portion coupling the second arm portion to the first arm portion, a third arm portion, and a third joint portion coupling the third arm portion to the second arm portion, the third arm portion being folded at the third joint portion toward the second arm portion in the first folded state, and the third arm portion being extendable at the third joint portion from the second arm portion in a first extendable state in which the first mechanism is located out of the first concave portion;
    a first driver configured to rotate the first arm portion around the first joint, so that the first opening is oriented in an arbitrary direction;
    a first mover configured to move the first mechanism in the first folded state into and out of the first concave portion through the first opening; and
    a second driver configured to rotate the third arm portion around the third joint portion in the first extendable state so that the third arm portion is folded at the third joint portion toward the second arm portion or is extended at the third joint portion from the second arm portion.

2. The moving robot according to claim 1, wherein the first mechanism further includes a fourth arm portion and a fourth joint portion coupling the fourth arm portion to the third arm portion, and the fourth arm portion is foldable at the fourth joint portion toward the third arm portion in the first extendable state, and the moving robot further comprises a third driver configured to rotate the fourth arm portion around the fourth joint portion in the first extendable state so that the fourth arm portion is folded at the fourth joint portion toward the third arm portion or is extended at the fourth joint portion from the third arm portion.

3. The moving robot according to claim 2, wherein the fourth arm portion further comprises a gripping mechanism configured to grip an article.

4. The moving robot according to claim 1, wherein the second and third arm portions are configured to be rotatable around longitudinal axes of the second and third arm portions, respectively, and the moving robot further comprises a third and fourth drivers configured to rotate the second and third arm portions around the longitudinal axes of the second and third arm portions, respectively.

5. The moving robot according to claim 2, wherein the second, third, and fourth arm portions are configured to be rotatable around longitudinal axes of the second, third, and fourth arm portions, and the moving robot further comprises drivers configured to rotate the second, third, and fourth arm portions around the longitudinal axes of the second, third, and fourth arm portions, respectively.

6. The moving robot according to claim 1, wherein the first joint portion is provided in a substantially central part of the main robot body, and a mounting portion configured to mount an article is provided on the main robot body.

7. The moving robot according to claim 1, wherein the main robot body has an other side portion and a fourth joint provided on the other side portion;
    the moving robot further comprises:
    a fourth arm portion coupled to the fourth joint and being rotatable around the fourth joint, the fourth arm portion having a second concave portion and a second opening with the second concave portion;
    a second mechanism capable to be accommodated in the second concave portion in a first folded state, the second mechanism including a fifth arm portion, a fifth joint portion coupling the fifth arm portion to the fourth arm portion, a sixth arm portion, and a sixth joint portion coupling the sixth arm portion to the fifth arm portion, the sixth arm portion being folded at the sixth joint portion toward the fifth arm portion in a second folded state, and the sixth arm portion being extendable at the sixth joint portion from the fifth arm portion in a second extendable state in which the second mechanism is located out of the second concave portion;
    a third driver configured to rotate the fourth arm portion around the fourth joint, so that the second opening is oriented in an arbitrary direction;
    a second mover configured to move the second mechanism in the second folded state into and out of the second concave portion through the second opening; and
    a fourth driver configured to rotate the sixth arm portion around the sixth joint portion in the second extendable state so that the sixth arm portion is folded at the sixth joint portion toward the fifth arm portion or is extended at the sixth joint portion from the fifth arm portion.

8. The moving robot according to claim 1, wherein the first driver is driven to orient the first opening toward a moving path for the moving robot, the first mover is driven to slide the first mechanism so as to bring the first mechanism into contact with the moving path, and the first driver rotates the first mechanism to lift the main robot body, thus allowing the robot to climb over an obstacle on the moving path.

9. The moving robot according to claim 1, wherein sensors are provided on the first arm portion, the sensors being rotated together with the first arm portion and detecting an obstacle around the robot.

10. The moving robot according to claim 1, wherein indicators are provided on the first arm portion rotated by the first rotating portion, the indicators being rotated together with the first arm portion and clarifying an operational status of the robot.

* * * * *